United States Patent
Kondrus et al.

(10) Patent No.: US 12,053,657 B2
(45) Date of Patent: Aug. 6, 2024

(54) EXPLOSION-PROOF HOUSING WITH SPLIT COVER

(71) Applicant: R. STAHL SCHALTGERÄTE GMBH, Waldenburg (DE)

(72) Inventors: Elena Kondrus, Künzelsau (DE); Jürgen Schmitt, Öhringen (DE); Natascha Sekinger, Baierbach (DE); Otto Walch, Gerabronn (DE); Christian Kochendörfer, Schwäbisch Hall (DE); Bernd Limbacher, Schwäbisch Hall (DE)

(73) Assignee: R. STAHL SCHALTGERÄTE GMBH, Waldenburg (DE)

( * ) Notice: Subject to any disclaimer, the term of this patent is extended or adjusted under 35 U.S.C. 154(b) by 704 days.

(21) Appl. No.: 17/263,481

(22) PCT Filed: Jul. 16, 2019

(86) PCT No.: PCT/EP2019/069148
§ 371 (c)(1),
(2) Date: Jan. 26, 2021

(87) PCT Pub. No.: WO2020/020708
PCT Pub. Date: Jan. 30, 2020

(65) Prior Publication Data
US 2021/0154504 A1 May 27, 2021

(30) Foreign Application Priority Data
Jul. 27, 2018 (DE) .................. 10 2018 118 195.7

(51) Int. Cl.
*A62C 4/00* (2006.01)
*A47B 81/00* (2006.01)
*E06B 5/12* (2006.01)

(52) U.S. Cl.
CPC ............... *A62C 4/00* (2013.01); *A47B 81/00* (2013.01); *E06B 5/12* (2013.01)

(58) Field of Classification Search
CPC ............. E06B 5/12; A47B 81/00; A62C 4/00
(Continued)

(56) References Cited

U.S. PATENT DOCUMENTS

| 3,617,570 A | 11/1971 | Redmore |
| 5,880,401 A | 3/1999 | Leischner et al. |

(Continued)

FOREIGN PATENT DOCUMENTS

| CA | 2373527 A1 | 6/2002 |
| CN | 200971692 Y | 11/2007 |

(Continued)

OTHER PUBLICATIONS

Atex Delvalle: "ATEX Enclosure Ex TRIBEX Series", Feb. 12, 2016 (Feb. 12, 2016), XP055673017, Gefunden im Internet [gefunden am Mar. 3, 2020]: URL: https://www.atexdelvalle.com/catalogos/Tribex_IP66_Delvalle_EN_v1.0-16.pdf.

(Continued)

*Primary Examiner* — Tremesha S Willis
(74) *Attorney, Agent, or Firm* — CANTOR COLBURN LLP

(57) ABSTRACT

An explosion-proof housing having a cover arrangement which includes two or more covers. The covers are adjacent to a flameproof gap in the housing body (11). A flameproof gap is likewise arranged between the individual covers. Special seals, more particularly in the form of a butt joint closure, are arranged on the remaining butt joints or other gaps and through-holes.

20 Claims, 4 Drawing Sheets

(58) Field of Classification Search
USPC ............................................ 174/520
See application file for complete search history.

(56) References Cited

U.S. PATENT DOCUMENTS

| | | | |
|---|---|---|---|
| 9,366,058 | B2 | 6/2016 | Zhao et al. |
| 9,592,411 | B2 | 3/2017 | Loureiro et al. |
| 10,148,149 | B2 | 12/2018 | Schwarz |
| 2001/0006111 | A1 | 7/2001 | Barlian et al. |
| 2016/0205723 | A1* | 7/2016 | Reiffenrath ............ H04M 1/026 455/552.1 |

FOREIGN PATENT DOCUMENTS

| | | |
|---|---|---|
| CN | 102222861 A | 10/2011 |
| CN | 102367123 A | 3/2012 |
| CN | 202227936 U | 5/2012 |
| CN | 202712771 U | 1/2013 |
| CN | 103313560 A | 9/2013 |
| CN | 203722085 U | 7/2014 |
| CN | 104213816 A | 12/2014 |
| CN | 104283132 A | 1/2015 |
| CN | 204168616 U | 2/2015 |
| CN | 204272529 U | 4/2015 |
| CN | 204315939 U | 5/2015 |
| CN | 204727363 U | 10/2015 |
| CN | 204885902 U | 12/2015 |
| CN | 105722764 A | 6/2016 |
| CN | 105756523 A | 7/2016 |
| CN | 105914596 A | 8/2016 |
| CN | 106285364 A | 1/2017 |
| CN | 206016606 U | 3/2017 |
| CN | 206894066 U | 1/2018 |
| CN | 206922251 U | 1/2018 |
| CN | 207232740 U | 4/2018 |
| CN | 108023285 A | 5/2018 |
| DE | 8508807 U1 | 5/1985 |
| DE | 3714253 A1 | 11/1988 |
| DE | 29520910 U1 | 5/1996 |
| DE | 19634973 A1 | 3/1998 |
| DE | 19860383 A1 | 7/2000 |
| DE | 29921637 U1 | 4/2001 |
| GB | 778040 A | 7/1957 |
| RU | 2352087 C2 | 4/2009 |
| RU | 2619269 C2 | 5/2017 |
| SU | 902337 A1 | 1/1982 |
| WO | 2015155426 A1 | 10/2015 |

OTHER PUBLICATIONS

European Office Action for European Application No. STSA P199 EP sr dated Mar. 9, 2022.
English Translation to International Search Report for Application No. PCT/EP2019/069148.
German Office Action for Application No. 10 2018 118 195.7; Date Issued: Apr. 11, 2019.
International Search Report for Application No. PCT/EP2019/069148.
Written Opinion for Application No. PCT/EP2019/069148.
Chinese Office Action dated Dec. 8, 2022; CN Application No. 201980049889.3, Filed Jul. 16, 2019; 11 pages; English Translation included.
Russian Search Report for Application No. 2021104016/07(008775); Date Issued: Oct. 2, 2022 (No English Translation).

* cited by examiner

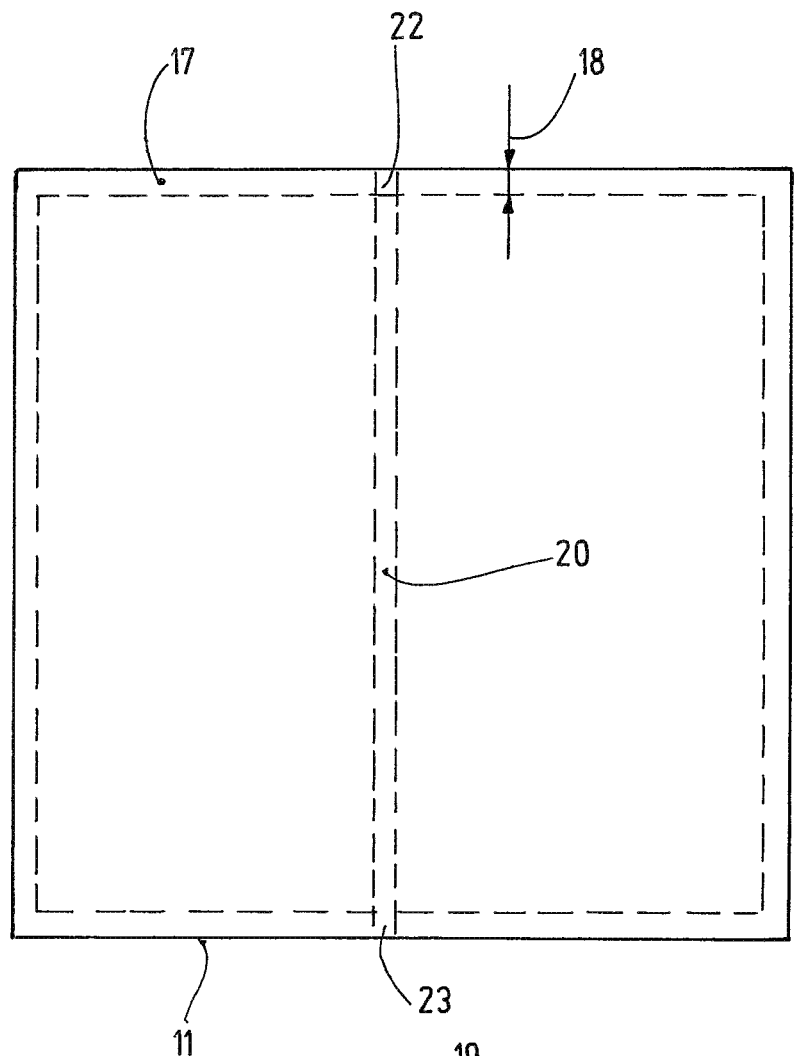
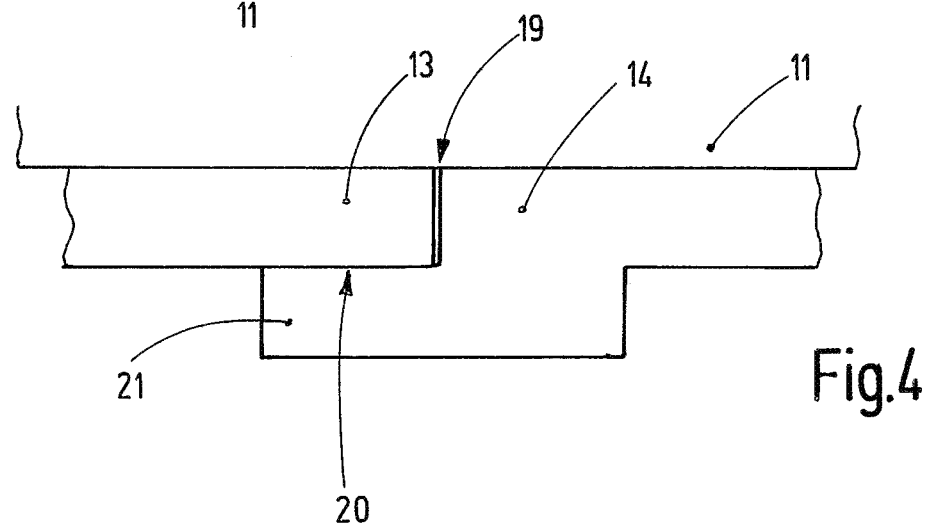

EXPLOSION-PROOF HOUSING WITH SPLIT COVER

CROSS REFERENCE TO RELATED APPLICATIONS

This application is a National Stage of PCT Application No. PCT/EP2019/069148 filed on Jul. 16, 2019, which claims priority to German Patent Application No. 10 2018 118 195.7 filed on Jul. 27, 2018, the contents each of which are incorporated herein by reference thereto.

BACKGROUND

The invention refers to an explosion-proof housing in which openings and joints that are present between the housing inner space and the environment are so tight and thereby so long that flames and glowing particles cannot escape from the housing into the environment. These housings comply with the protection type "ex-d", that is also referenced as flameproof enclosure.

Housings of the known configuration type are known, for example, from GB 778 040. The housing described there comprises a housing body with a cover attached thereon. The cover is held on the housing by means of appropriate clamping means, wherein a sealing is arranged between the cover and the housing. The housing is in addition provided with a pressure relief device for overpressure reduction that is formed by a porous body held on a housing opening.

U.S. Pat. No. 3,617,570 describes a housing, the housing body of which is closed by a bottom plate. It is held at the housing by means of screws. A joint is formed between the bottom plate and the housing body that extends circumferentially.

The forming of a joint between housing parts of a flameproof enclosure is also known from DE 198 60 383 B4. The housing parts abut against each other at a planar joint and are clamped against one another by means of screws.

The connection of housing parts of flameproof enclosures by means of a flat gap has basically has proven itself. In this manner a flameproof enclosure can be closed by means of a cover that is connected to the housing via a flat gap that extends continuously circumferentially. However, in larger housings, due to the weight and size of the cover, handling problems occur. This applies particularly if not only the housing, but also the cover is very large, e.g. in order to have unimpeded access to the elements installed in the housing, if necessary. Also large covers are disturbing in restricted installation conditions, e.g. in ships or on oil rigs, because sufficient emergency escape routes have to always be provided.

BRIEF SUMMARY

It is an object of the invention to create a concept for an explosion-proof housing that avoids or mitigates at least one of the mentioned problems.

An explosion-proof housing, including: a housing body enclosing an inner space and having an access opening; a cover arrangement that comprises at least a first cover and a second cover; and wherein a flameproof gap is formed between the first cover and the second cover and a flameproof gap is formed between the first cover and the housing body and a flameproof gap is formed between the second cover and the housing body.

The housing is provided with a cover arrangement that comprises two or more covers. The covers form a flameproof gap with the housing in each case that, however, does not extend over the whole cover circumference, but rather extends along the circumference of the cover arrangement. Between the two covers of the cover arrangement another flameproof gap is arranged that, however, different than the gap extending around the cover arrangement, is not continuous in a ring-shaped manner and thus endless, but is configured in a linearly extending manner and thus comprises two ends. The ends of the flameproof gap formed between the covers are in contact with the circumferentially extending ring-shaped flameproof gap or end with small distance thereto.

The flameproof gap limited by the at least two covers and the housing body is preferably configured as flat gap that is further preferably arranged in one plane.

Also the flameproof gap formed between the two covers is preferably a flat gap. It can extend in the same plane as the first mentioned circumferentially extending flameproof gap or can be arranged in a plane that is offset to this plane. This allows numerous possibilities for the configuration of the junction between the circumferentially extending flameproof gap and the flameproof gap defined between the two covers.

In addition, a butt joint can be formed between the two covers that apart from its ends, does not have to be configured in a flameproof manner. On its flank facing the environment, i.e. in its transverse direction, it can be secured against the escape of flames by the flameproof gap formed between the two covers, the butt joint can be provided with a butt joint closure at its two ends that impedes ignition breakthrough. In doing so, tolerances are allowed for the butt joint that facilitate the positioning of the two covers during closure of the housing. For example, hinges with clearances can be provided for temporarily holding of the two covers in the open position. In addition, the covers can be connected with the housing body by means of screws, quick release clamps or other closing mechanisms that position the two covers relative to each other and thereby allow a comparably large tolerance (e.g. about 1 mm or more). This is a construction simplification and concurrently an installation simplification during opening and closing of the housing.

BRIEF DESCRIPTION OF THE DRAWINGS

Embodiments of the invention with which one or more of the mentioned advantages can be achieved, are content of the specification, the drawings or the dependent claims. The drawings show:

DETAILED DESCRIPTION

Figure 1:
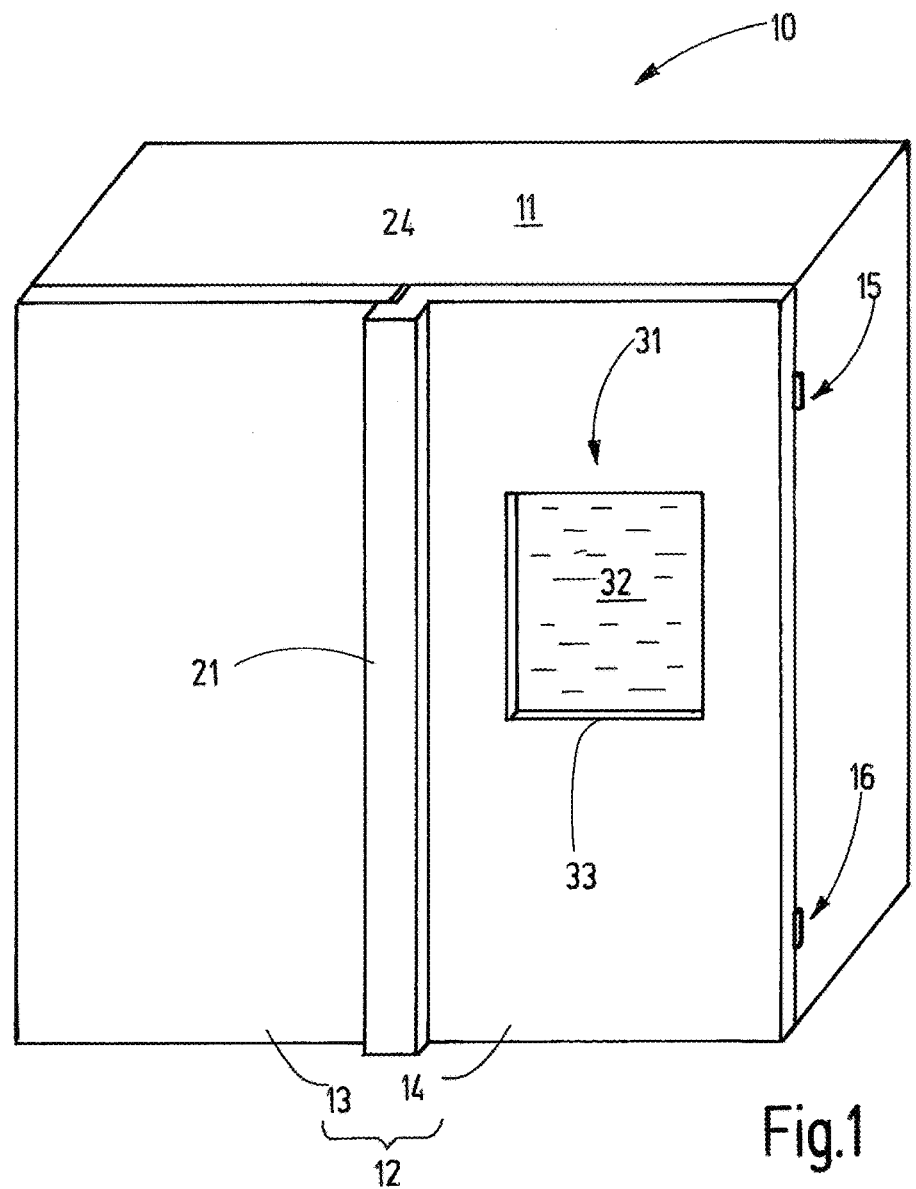
FIG. 1 the inventive housing in a perspective basic illustration with main view of the front, FIG. 2 the housing according to FIG. 1 in a top view, FIG. 3 the housing according to FIG. 1 in a front view with particular illustration of the flameproof gaps, FIG. 4 a section of the cover according to FIG. 2 in the area of the connection of its two covers with one another, FIG. 5 a modified construction of the cover in the illustration according to FIG. 4, FIG. 6 a further modified construction type of the housing and its cover in a sectional illustration in a view according to FIG. 4, FIG. 7 a further modified embodiment of the inventive housing with particular illustration of its butt joint closure in top view with transparently illustrated covers, FIGS. 8-10 further embodiments of the inventive housing in perspective illustration respectively with particular focus on the butt joint closure.

In FIG. 1 a housing 10 is illustrated that is configured as explosion-proof housing according to the ignition protection type flameproof enclosure. The housing 10 comprises a housing body 11 that encloses an inner space for housing of components that could form ignition sources. The housing body 11 can be configured in the manner of a box with walls extending orthogonally to one another or also in another manner. The housing body 11 comprises an access opening that is closed by a cover arrangement 12. At least a first cover 13 and a second cover 14 that jointly close the access opening of the housing body 11 are part of the cover arrangement 12. The two covers 13, 14 are held at the housing body 11 by means of suitable, not illustrated clamping means and are clamped against each other. Screws, clamping brackets or other clamping means that clamp the two covers 13, 14 toward the housing body 11 and against one another can serve for this purpose. In addition, the covers 13, 14, as illustrated by the example of a cover 14 in FIG. 1, can be held on the housing body 11 by hinges 15, 16 (as well as 15', see FIG. 2 on the cover 13) or similar support means that support the weight of the respective cover 13, 14, if the cover arrangement 12 is open.

The hinges 15, 16 (as well as 15', 16') preferably define a common hinge axis with some clearance extending parallel to one of the sides of the housing body 11, such that an alignment of the cover 14 on the housing body 11, e.g. by means of register pins or the like, is possible when the cover 14 is closed.

Figure 2:
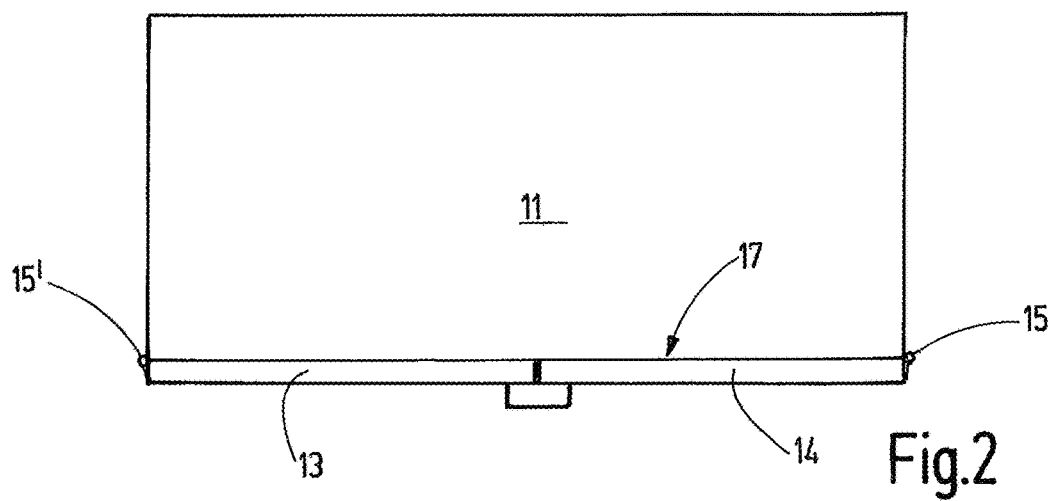

The two covers 13, 14 abut on the housing body 11 at a flameproof gap 17 as apparent from FIG. 2. This flameproof gap 17 is again illustrated in FIG. 3. There it is limited outwardly by the contour of the housing body 11 and inwardly by a dashed line that marks the boundary of the access opening of the housing body 11. Typically the flameproof gap 17 comprises a width 18 that is sufficient to cool passing gases and to avoid the breakthrough of flames. The gap 17 defined between the cover arrangement 12 and the housing body 11 extends along the whole circumference of the cover arrangement 12 or the housing body 11, such that it completely surrounds the access opening. The gap 17 thereby follows the form of the access opening and can be accordingly ring-shaped polygonal, ring-shaped round or shaped in another way, but can be configured continuously and thus endlessly thereby. At the butt joint between the two covers 13, 14 the housing body 11 does not have an abutment surface, at least preferably. In other words, the gap 17 is then unbranched. On the side of the housing body 11 no abutment surface for the covers 13, 14 is provided. Each cover 13, 14 thus only abuts on the housing body 11 on three sides.

As already obvious from FIG. 2, the gap 17 is preferably configured as planar gap. It is formed between an abutment surface that is formed on the housing body 11 and corresponding assigned rear abutment surfaces of the covers 13, 14. The clamping and holding means of the covers 13, 14 that are effective on the housing 10, hold the covers 13, 14 thereby in firm abutment with the housing body. Further clamping means hold the covers 13, 14 in firm abutment with one another. The clamping direction of the clamping and holding means that clamp the covers 13, 14 against the housing body preferably correspond with the clamping direction in which the covers 13, 14 are clamped against one another. In doing so it is achieved that at least also in the case of an impulse-like pressure increase in the housing 10, the gap width between the covers 13, 14 and the housing, as well as the gap width between the covers 13, 14 does not exceed in most cases a few hundredth millimeters, but in any case a dimension that impedes an ignition breakthrough.

The two covers 13, 14 can close the access opening of the housing body 11, preferably approximately by half in each case. Thereby in the closed condition they are arranged opposite each other at a butt joint 19 that is apparent from FIG. 4. This butt joint is subject to a certain tolerance with regard to its width that results from manufacturing tolerances, temperature changes and tolerances with regard to the positioning of the two covers 13, 14 on the housing body 11. Thereby the butt joint 19 is preferably dimensioned such that the covers 13, 14 abut against one another on the face sides and do not clamp in an undesired manner or impede closing of the covers 13, 14.

However, a flameproof gap 20 is formed between the two covers 13, 14 in that one of the covers, here e.g. the cover 14, comprises a bar-like projection 21 that extends over the other cover 13. The projection 21 comprises a planar surface on the side facing the cover 13 that abuts against the outer side of the cover 13 and forms the strip-shaped gap 20 together with it. It is again shown in FIG. 3. It extends, as apparent, diametrically over the access opening surrounded by the gap 17 and overlaps the gap 17 at two locations arranged opposite each other that concurrently form the ends 22, 23 of the gap 20. The projection 21 can be formed by a bar placed on, screwed on, welded on or glued in the cover 14 or milled out of the cover 14 or can be formed in another manner. On the side facing the cover 13 the projection 21 comprises a non-deformable, e.g. planar, e.g. processed surface such that the two surfaces can be mounted firmly abutting against one another. Clamping means that are not illustrated in FIG. 1 clamp the projection 21 against the cover 13 such that the processed surfaces firmly abut against each other. Alternatively, both covers 13, 14 can be formed from massive material and can be provided with a respective milled groove open to the edge at the overlapping location such that they engage one another, for example according to FIG. 5. Also in doing so, the length and narrowness of the gap 20 between the covers 13, 14 impeding an ignition breakthrough can be ensured.

The butt joint 19 can form openings in the region of the ends 22, 23 that are not yet flameproof by themselves. For this reason, one butt joint closure is provided at both ends 22, 23 respectively, as is for example illustrated in FIG. 8 by way of example of the end 23. The butt joint closure can be formed by a sealing, like the elastic seal 25 illustrated in FIG. 8 that fits in a respective opening 26 that is, e.g. formed as cylinder opening at the end of the butt joint 19 and limited by half-cylindrically rounded faces of the two covers 13, 14. The elastic seal 25 can be an elastic cylinder (rubber cylinder or the like) or also a hollow cylinder that can be transferred in different shapes by change of shape. For this, for example, an eccentric, a pressure screw or another clamping means can be provided that is centrically arranged in the elastic seal 25. Instead of rubber another deformable material, e.g. metal, a metallized plastic or the like, can be used. Instead of the pairing of a cylindrical opening 26 with a cylindrical seal, other cross-sectional shapes, such as for example a rectangular or polygonal shape or the like, can be used for the opening 26 as well as the seal 25. The seal 25 abuts equally against both faces of the covers 13, 14 and in addition, tightly adjoins the gap 17 as well as the gap 20, as particularly apparent from FIG. 8. The change of shape of the elastic seal 25 can be achieved by a shaft or another measure, e.g. a screw, a wedge, a cone, compression between the covers 13, 14 or another possibility for exerting pressure on the seal 25.

Numerous modifications can be made to the embodiment of the housing 10 described thus far that refer to the arrangement of the gap 20 and the butt joint 19, as well as the configuration of the butt joint closure 24. For example, the butt joint cross-section can be reduced in that the distance between the flameproof gap 17 and the flameproof gap 20 is decreased as it is illustrated by way of example in FIG. 5. There the cover 13 comprises a matching recess for the projection 21 of the cover 14, such that the width of the butt joint 19 is reduced. At its ends it can be in turn provided with a butt joint closure 24.

Figure 5:
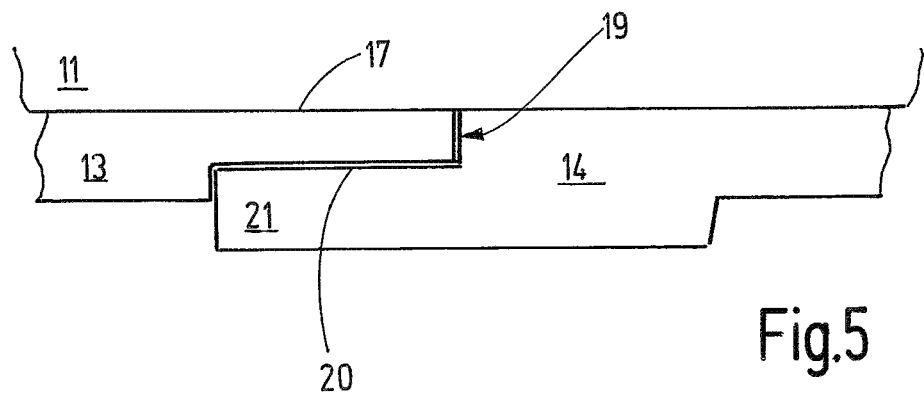
Figure 6:
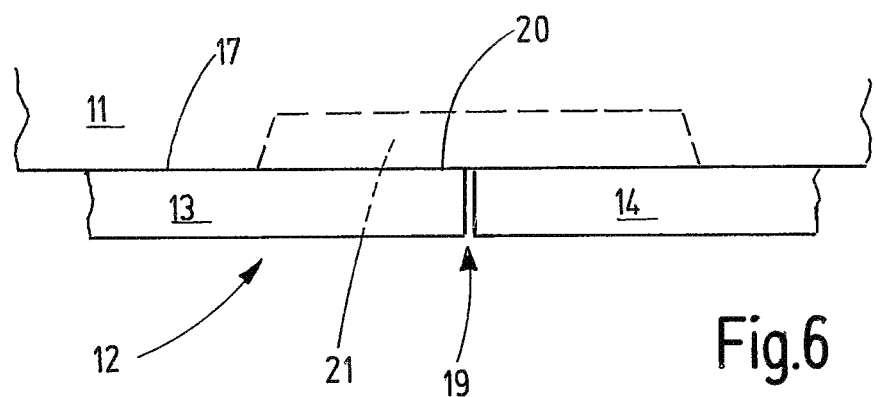

According to FIG. 6, it is also possible to arrange the projection 21 of the cover 14 inside the inner space of the housing body 11 such that the projection 21 does not extend over the top of the cover 13, as illustrated in FIGS. 4 and 5, but extends underneath it. In doing so, the flameproof gap 17 and the flameproof gap 20 are arranged in a common plane. The butt joint 19 is now located on the side of the cover arrangement 12 that is open to the environment. In turn butt joint closure 24 can be arranged at the critical junctions between the gap 20 and the gap 17 that bridges the location at which the gap 20 adjoins the gap 17.

Figure 7:
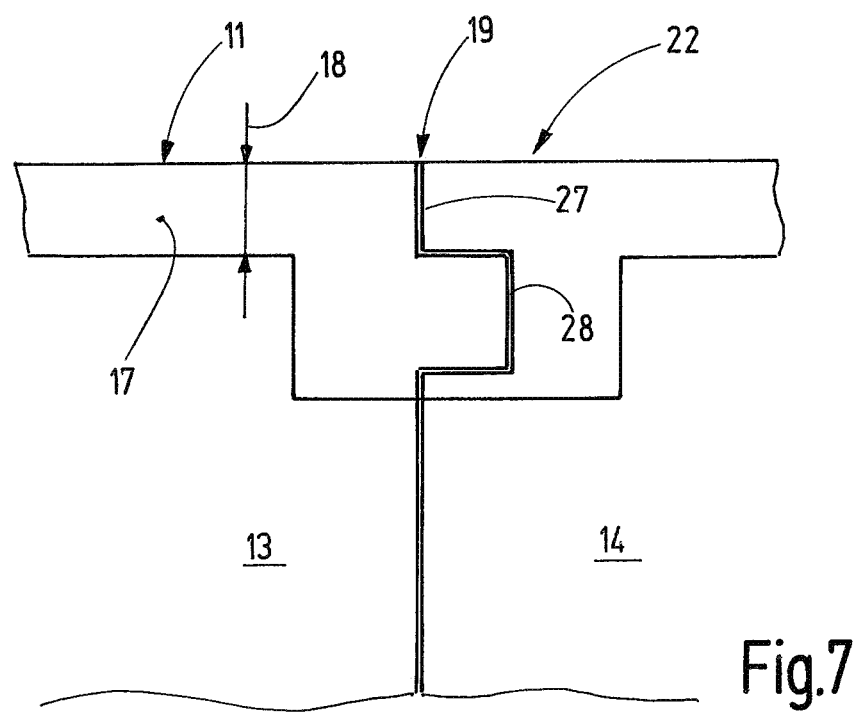

It is also possible to configure the butt joint itself in a flameproof manner. For this FIG. 7 illustrates a butt joint configuration in a top view from above that can be applied in the embodiments according to FIGS. 1 to 5. For this the two covers 13, 14 are transparently illustrated in FIG. 7. In the area of the end 22 of the butt joint 19 the housing body 11 comprises a projection that is orientated inwardly and extends parallel to the back sides of the covers 13, 14 and that exceeds the width 18 and is thus wider as, e.g. 25 mm. In the desired embodiment it has a width of 60 mm, as an example. Above this projection against which the covers 13, 14 are in firm abutment, the butt joint 19 is shaped in the manner of a labyrinth, e.g. in the type of a meander shape, a corrugated shape, a toothing engaging in one another or the like. Particularly multiple butt joint sections 27, 28 are formed, each comprising a length that results in the flameproof condition, e.g. the length of 25 mm or more. In the embodiment according to FIG. 7 in the extension of the butt joint 19 at least two, preferably however multiple corners are present in order to guarantee the flameproof geometry of the butt joint. The angles provided along the extension of the butt joint can be 90° or can have another value.

Figure 8:
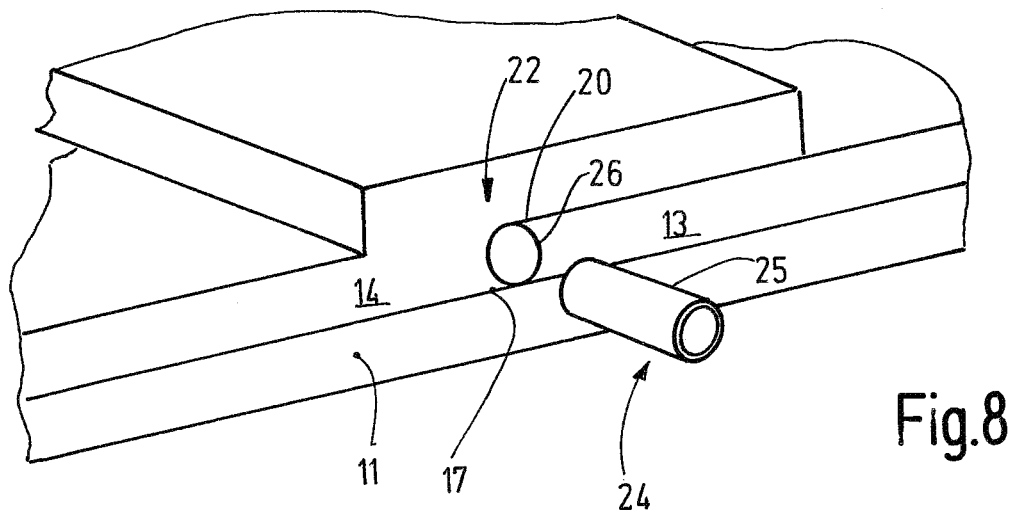
Figure 9:
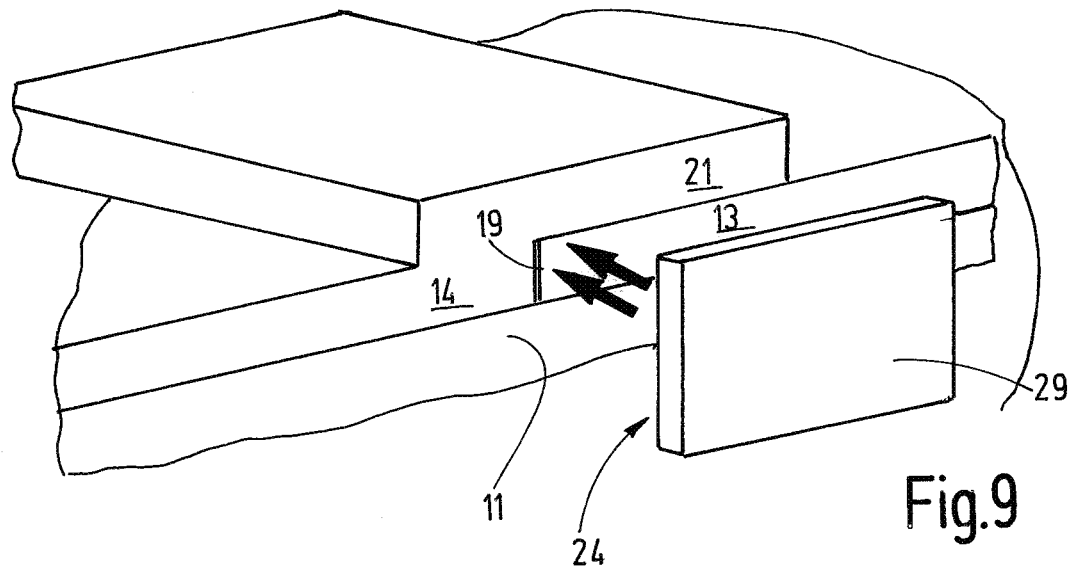
Figure 10:
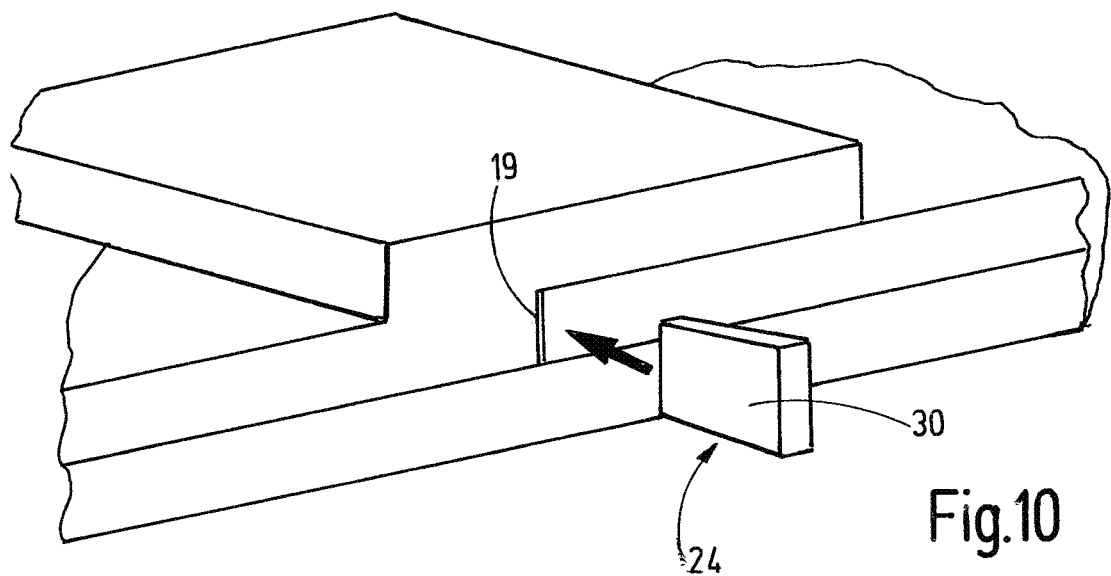

In all embodiments with butt joint 19 arranged inside in which the butt joint 19 is positioned between the gaps 17 and 20 the end side sealing of the butt joint 19 can be carried out according to any of the principles illustrated in FIGS. 8-10. For example, the butt joint 19 can be closed by means of a cover 29, as obvious from FIG. 9, that covers the projection 21 as well as the part of the cover 13 arranged underneath and the part of cover 14 adjoining the butt joint 19 and a part of the housing 11. The cover 29 can be attached to the housing body 11 and/or the covers 13, 14 by means of suitable attachment means, as screws, clamps or the like.

Alternatively, a wedge-type seal element 30 of flexible or non-flexible material that can be hollow or massive, can be inserted in the end of the butt joint 19 as butt joint closure 24. The wedge-shaped seal element 30 can also consist of a porous material (just like the seal element 25). The porosity of the material is selected thereby such that the material is inhibiting against flame breakthrough.

All embodiments of the housing 10 have in common that it is at least preferably provided with a pressure relief device 31 as it is by way of example illustrated in FIG. 1. At least one porous body 32 is part of the pressure relief device 31 that is arranged either in the closed inner space of the housing 11 or on the pressure relief opening 33. The pressure relief opening 33 connects the inner space of the housing 10 with the environment and can be arranged in at least one of the covers 13, 14 and/or in the housing body 11. The pressure relief opening 33 and the pressure relief body 32 arranged therein impede the buildup of a detrimental overpressure peak in the housing 10, if an explosive gas mixture that is present there is ignited, e.g. during the operation of electrical components. Due to the effective mitigation of pressure peaks by porous bodies 32 with sufficient volume, hot gas flows entering these bodies 32 are cooled thus far that their volume reduction impedes a pressure buildup in the housing 10. In addition, with the arrangement of the porous body 32 in a pressure relief opening 33 an additional pressure relief effect can be achieved by the escape of gas into the environment.

The effective pressure relief of the housing 10 as well as the firm clamping of the cover arrangement 12 against the housing body 11 and also the firm clamping of the two covers 13, 14 against one another in the area of the projection 21 by means of clamping means arranged along the projection, as well as by means of clamping means arranged at the circumference of the cover arrangement 12, allows a configuration of the cover arrangement 12 with two or more casements. In doing so, the size and the weight of the covers 13, 14 are reduced to an amount that can be handled, while the housing can be configured particularly large. In addition, the reduction of a pressure peak effectuated by the pressure relief device 31 results in that the gap geometry is maintained also in case of an explosion inside the housing 10 and in that an ignition breakthrough is avoided. The flameproof gap geometry can be compelled in the closed condition by means of one or more of hinges, positioners, register pins, definition of shape of the gap geometry, definition of the shape of butt joint, screw-in aids, register shapes or mechanical joining.

The inventive explosion-protected housing 10 comprises a cover arrangement 12 that consists of two or more covers 13, 14. The covers 13, 14 adjoin a flameproof gap 17 in the housing body 11. At least one flameproof gap 20 is also arranged between the individual covers 13, 14. On the remaining butt joints or other gaps and passages separate seals are arranged, particularly in the form of a butt joint closure 24.

LIST OF REFERENCE SIGNS 10 housing
11 housing body
12 cover arrangement
13 first cover
14 second cover
15,15',16 hinges
17 gap
18 width of gap 17
19 butt joint
20 gap
21 projection
22,23 end of gap 20
24 butt joint closure
25 elastic seal
26 opening 27,28 butt joint sections
29 cover
30 seal element
31 pressure relief device
32 porous body
33 pressure relief opening

The invention claimed is:

1. An explosion-proof housing, comprising:
a housing body enclosing an inner space and having an access opening;
a cover arrangement that comprises at least a first cover and a second cover; and
wherein a flameproof gap is formed between the first cover and the second cover and a flameproof gap is formed completely around the first cover, the second cover and the housing body, wherein the flameproof gap formed between the first cover and the second cover extends from and into the flameproof gap that is formed completely around the first cover, the second cover and the housing body.

2. The housing according to claim 1, wherein the flameproof gap formed between the first cover and the second cover and the flameproof gap that is formed completely around the first cover, the second cover and the housing body are flat claps.

3. The housing according to claim 1, wherein the flameproof gap formed between the first cover and the second cover and the flameproof gap that is formed completely around the first cover, the second cover and the housing body are arranged in one plane.

4. The housing according to claim 1, wherein the flameproof gap formed between the first cover and the second cover is a flat gap.

5. The housing according to claim 1, wherein the flameproof gap formed between the first cover and the second cover is orientated parallel to the flameproof gap that is formed completely around the first cover, the second cover and the housing body.

6. The housing according to claim 1, wherein a butt joint is formed between the first cover and the second cover.

7. The housing according to claim 6, wherein the butt joint is arranged to connect the flameproof gap formed between the first cover and the second cover with the flameproof gap that is formed completely around the first cover, the second cover and the housing body.

8. The housing according to claim 6, wherein the butt joint is provided with a butt joint closure.

9. The housing according to claim 8, wherein the butt joint closure is arranged on a side of an end with regard to the butt joint.

10. The housing according to claim 1, wherein the housing further comprises a pressure relief device.

11. The housing according to claim 1, wherein the first cover and the second cover are arranged in a manner overlapping each other for forming of the flameproof gap between the first cover and the second cover.

12. The housing according to claim 2, wherein the flameproof gap formed between the first cover and the second cover and the flameproof gap that is formed completely around the first cover, the second cover and the housing body are arranged in one plane.

13. The housing according to claim 12, wherein the flameproof gap formed between the first cover and the second cover is a flat gap.

14. The housing according to claim 13, wherein the flameproof gap formed between the first cover and the second cover is orientated parallel to the flameproof gap that is formed completely around the first cover, the second cover and the housing body.

15. The housing according to claim 14, wherein a butt joint is formed between the first cover and the second cover.

16. The housing according to claim 15, wherein the butt joint is arranged to connect the flameproof gap formed between the first cover and the second cover with the flameproof gap that is formed completely around the first cover, the second cover and the housing body.

17. The housing according to claim 15, wherein the butt joint is provided with a butt joint closure.

18. The housing according to claim 17, wherein the butt joint closure is arranged on a side of an end with regard to the butt joint.

19. The housing according to claim 18, wherein the housing further comprises a pressure relief device.

20. The housing according to claim 1, wherein the flameproof gap formed between the first cover and the second cover and the flameproof gap that is formed completely around the first cover, the second cover and the housing body are configured to cool gases passing from the inner space and to avoid the breakthrough of flames from the inner space.

* * * * *